US008777183B2

(12) United States Patent
Carrato et al.

(10) Patent No.: US 8,777,183 B2
(45) Date of Patent: Jul. 15, 2014

(54) DEVICE FOR CONNECTING A GAS-OPERATED APPLIANCE AND A GAS CARTRIDGE

(75) Inventors: Eric Carrato, Chaussan (FR); Marc Champion, Tassin la Demi Lune (FR); Sylvain Arnaud, Ouillins (FR); Jean-Marc Billard, Lyons (FR)

(73) Assignee: Application des Gaz (FR)

( * ) Notice: Subject to any disclaimer, the term of this patent is extended or adjusted under 35 U.S.C. 154(b) by 0 days.

(21) Appl. No.: 13/323,732

(22) Filed: Dec. 12, 2011

(65) Prior Publication Data

US 2012/0080627 A1 Apr. 5, 2012

Related U.S. Application Data

(63) Continuation of application No. 11/737,444, filed on Apr. 19, 2007, now Pat. No. 8,074,965.

(30) Foreign Application Priority Data

Oct. 19, 2004 (FR) ...................................... 04 11089
Oct. 19, 2005 (WO) ........................ PCT/FR05/02598
Apr. 20, 2006 (FR) ...................................... 06 03512

(51) Int. Cl.
*F16L 37/28* (2006.01)
(52) U.S. Cl.
USPC ....................... 251/149.9; 251/144; 251/149.1
(58) Field of Classification Search
USPC .................. 251/89.3, 89.5, 144, 149.1, 149.5, 251/149.6, 149.9; 222/402.1, 402.24, 222/402.25
See application file for complete search history.

(56) References Cited

U.S. PATENT DOCUMENTS

| 3,180,374 | A | * | 4/1965 | Muller ............................ 141/20 |
| 4,207,934 | A | * | 6/1980 | Scremin et al. ............... 141/383 |
| 5,330,154 | A | * | 7/1994 | Mashburn et al. ............ 251/144 |
| 5,549,228 | A | * | 8/1996 | Brown .......................... 222/570 |
| 5,762,319 | A | * | 6/1998 | Kopp .......................... 251/149.6 |
| 5,927,563 | A | * | 7/1999 | Kellner .................... 222/402.22 |
| 5,954,044 | A | * | 9/1999 | Schmidt et al. ................ 126/38 |
| 6,202,982 | B1 | * | 3/2001 | Huguet et al. ............. 251/149.9 |
| 7,571,841 | B2 | * | 8/2009 | Gibson et al. ................... 227/10 |

* cited by examiner

*Primary Examiner* — John K Fristoe, Jr.
*Assistant Examiner* — Marina Tietjen
(74) *Attorney, Agent, or Firm* — Cantor Colburn LLP

(57) ABSTRACT

A device for connecting gas equipment to a valve of a gas cartridge, having a tap body fixed to the gas equipment, an axial coupling ring fixed to the body of the tap and having at least one elastic lug which can engage radially in a groove of a valve of the cartridge, a rotary locking ring which can occupy a locking position in which the rotary ring keeps each lug engaged in the groove and a release position in which the rotary ring allows each elastic lug to be disengaged from the groove, and a cylinder having a tube which can override the shut-off device of the valve, wherein the rotary locking ring has radial coupling means which can interact with complementary radial coupling means provided on the gas cartridge valve, so that the device can be moved from a locking position to a release position by the rotation of the cartridge.

3 Claims, 4 Drawing Sheets

DEVICE FOR CONNECTING A GAS-OPERATED APPLIANCE AND A GAS CARTRIDGE

CROSS-REFERENCE TO RELATED APPLICATIONS

This application is a continuation of U.S. application Ser. No. 11/737,444, filed Apr. 19, 2007 which patent application claims the benefit of French Patent Application Number 06.03512, filed Apr. 20, 2006 and PCT/FR05/02598 filed Oct. 19, 2005 which claims priority to French Patent Application No. 04.11089 filed on Oct. 19, 2004, all of which are incorporated herein.

TECHNICAL FIELD

The present invention relates to a connecting device for gas equipment and a gas cartridge having a valve.

BACKGROUND OF THE INVENTION

In the field of portable cooking, lighting and do-it-yourself equipment operating with pressurized combustible gas cartridges, the system for connecting the equipment to the cartridge is of crucial importance because of the danger that may be caused by a leakage of gas or by disconnection of the equipment from its cartridge.

Gas cartridges have been used for many years; a typical gas cartridge is a metallic container holding pressurized combustible gas, into which a valve is crimped. This valve provides access to the gas contained in the cartridge.

The connecting device of the equipment has two functions. On the one hand, it physically retains the equipment on the cartridge, while on the other hand it simultaneously opens the valve while forming a seal.

DESCRIPTION OF THE PRIOR ART

Documents EP A 278 873 and EP A 981 005 disclose two coupling systems which use flexible fastening lugs which are engaged in an annular groove of the valve formed when the valve is crimped on to the cartridge. The flexible lugs are locked in the groove of the valve and make the equipment inseparable from the cartridge.

These coupling systems are satisfactory on the whole, but their fitting requires a degree of care on the part of the user.

The object of the invention is therefore to propose a device for connecting gas equipment and a gas cartridge, operating by this system, which can be fitted simply and easily.

Another object of the invention is to maintain the compatibility of the cartridge with existing gripper-type connecting systems, particularly the connecting systems described in EP A 278 873 and EP A 981 005, but also with connecting systems in which the connecting device is intended to be screwed onto the cartridge.

SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description of some embodiments that are presented later.

The invention essentially proposes a device for connecting gas equipment to a valve of a gas cartridge, comprising:
- a tap body fixed to the gas equipment,
- an axial coupling ring fixed to the body of the tap and having at least one elastic lug which can engage radially in a groove of a valve of the cartridge,
- a rotary locking ring which can occupy a locking position in which the rotary ring keeps each lug engaged in the groove and a release position in which the rotary ring allows each elastic lug to be disengaged from the groove, and
- a cylinder having a tube which can override the shut-off device of the valve, wherein the rotary locking ring has radial coupling means which can interact with complementary radial coupling means provided on the gas cartridge valve, so that the device can be moved from a locking position to a release position by the rotation of the cartridge.

The essential principle of the invention is that the rotary ring of the device is rotated by the cartridge itself.

This is because the cartridge is the most bulky component of the system formed by the cartridge and equipment, and is therefore the easiest to grasp. Moreover, a considerable torque can be applied by rotating the cartridge.

In one embodiment, the rotary ring has at least one radial notch.

In a particularly advantageous embodiment, the rotary ring has a plurality of radial notches on its periphery.

To retain the device securely on the cartridge, the axial coupling ring has a plurality of elastic lugs, each having a coupling rib at its end.

In one possible embodiment, the axial coupling ring has three elastic lugs, positioned at intervals of 120°, each having a coupling rib at its end.

The locking of the elastic lugs is made possible by the fact that the rotary locking ring has a plurality of heels, each of which can be made to bear on a lug of the coupling ring.

In a possible embodiment, the rotary locking ring has three heels positioned at intervals of 120°, each of which can be made to bear on one lug of the coupling ring.

In an advantageous arrangement, a stop is adjacent to at least one of the heels.

Preferably, a stop is adjacent to each heel.

According to a preferred characteristic, the rotary ring has at least one axial rib which can snap into at least one axial groove formed in the inward-facing surface of an elastic lug.

To reset the device to its release position, elastic return means are interposed between the coupling ring and the rotary ring, the return action of these means tending to make the rotary ring return to the release position.

In a possible embodiment, a spring is interposed between the coupling ring and the rotary ring, and its action tends to make the rotary ring return to the release position.

To enable the state of the device to be indicated to a user, the device has means for visually signalling the position of the rotary ring.

In one embodiment of the device, the coupling ring has a skirt in which is formed an aperture revealing a locking symbol provided on the rotary ring when the device is in the locking position and revealing a release symbol provided on the rotary ring when the device is in the release position.

The invention also relates to a liquid combustible gas cartridge, comprising a container having an opening blocked by a valve, the said valve having a circular radial bottom wall which supports a central shut-off device and lateral cylindrical axial wall which has, at its connection to the container, an annular groove surmounted by an annular bead, wherein the axial wall has at least one radial coupling means which can interact with complementary radial coupling means provided in a rotary ring of a connecting device for gas equipment, enabling the device to be moved from a locking position to a release position by the rotation of the cartridge.

In a possible embodiment, the axial wall of the valve has at least one radial tooth.

Preferably, the axial wall of the valve has a plurality of radial teeth.

Additionally, the coupling means are adjacent to the circular radial bottom wall. Advantageously, the valve also comprises means for screw-fastening a connecting device for a gas-operated appliance.

Preferably, the screw-fastening means comprise a screw thread formed on an axial cylindrical wall of the central shut-off device.

Thus, the cartridge according to the invention also allows for compatibility with existing screw-fastened connecting devices.

BRIEF DESCRIPTION OF THE SEVERAL VIEWS OF THE DRAWINGS

To enable it to be understood more clearly, the invention is described with reference to the attached drawing which shows, by way of example and without restrictive intent, an embodiment of a device for connecting gas equipment and a gas cartridge according to the invention.

DETAILED DESCRIPTION OF THE INVENTION

Figure 1:
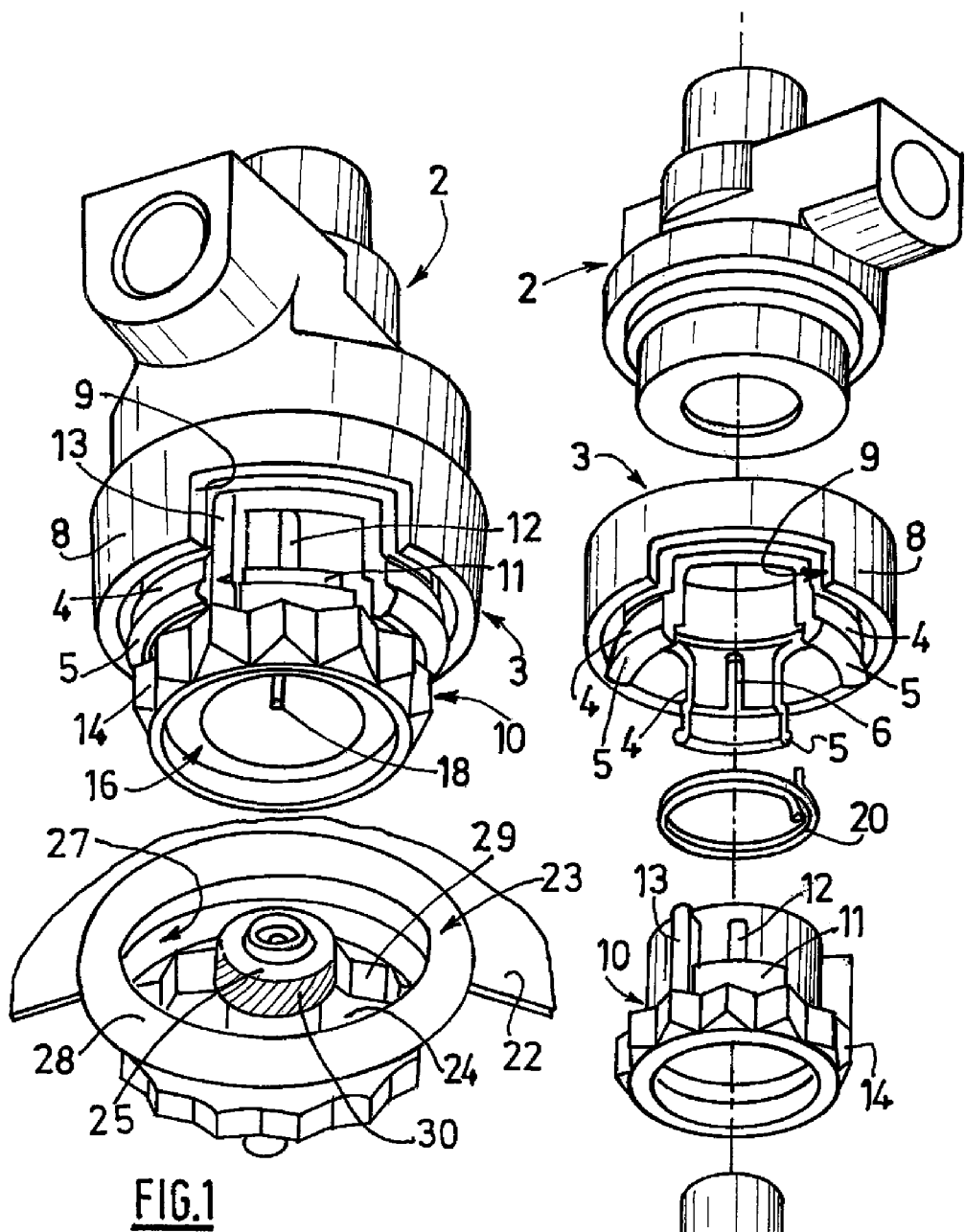
FIG. 1 is a perspective view of the connecting device and of the cartridge, the cartridge being represented in partial form.

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described. In addition, to the extent that orientations of the embodiments are described, such as "top," "bottom," "front," "rear," "right," and the like, the orientations are to aid the reader in understanding the embodiment being described, and are not meant to be limiting.

In the first place, it will be recalled that the connecting device for gas equipment relates to all types of portable gas equipment such as heaters, burners, lamps, barbecues or do-it-yourself equipment. The gas equipment is not shown in the drawing, but can be any of the aforementioned types of equipment.

A first type of connecting device according to the invention will be described first.

Figure 2:
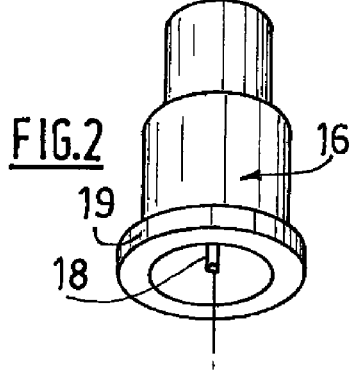
FIG. 2 is an exploded perspective view of the connecting device.

Reference should be made to FIG. 2 initially.

As shown in this figure, the connecting device comprises, firstly, a tap body 2, in other words a metal part used to open or close the gas passage. This tap body 2 has a conventional structure.

A coupling ring 3 is engaged with this tap body 2. This coupling ring 3 can be made from a plastics material or other materials, and has three lugs 4 positioned at intervals of 120°. Each of the lugs 4 has a projecting rib 5 at its free end. Each of the lugs has a longitudinal groove 6 formed in its inner surface.

It should also be noted that the coupling ring 3 has a skirt 8 in which an aperture 9 is formed. An important point to note concerning the coupling ring is that it is fixed to the body of the tap. In other words, the coupling ring is not allowed to rotate with respect to the body of the tap.

A rotary ring 10 is engaged with the coupling ring 3. This rotary ring 10 can be made from plastics material and is approximately cylindrical.

Figure 5:
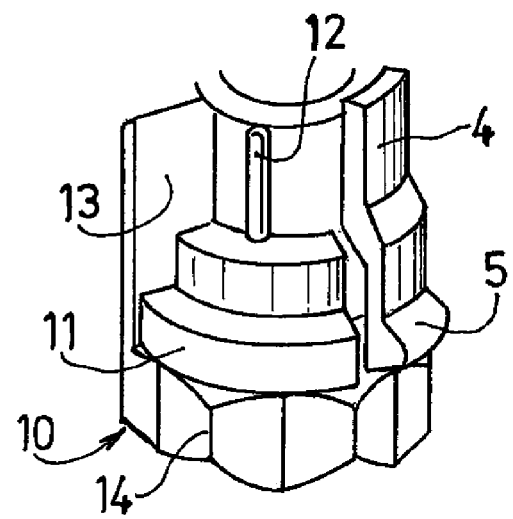
FIG. 5 is a view of details of the connecting device.

As shown more clearly in FIG. 5, the rotary ring has heel 11 on its outer face; in the example shown, this heel 11 has a stepped structure and is surmounted by a longitudinal rib 12.

It should also be noted that each heel 11 has a radial stop 13 next to its edge.

The rotary ring has a plurality of radial notches 14.

In the example shown, these radial notches 14 are formed on a collar located at the base of the rotary ring.

Figure 3:
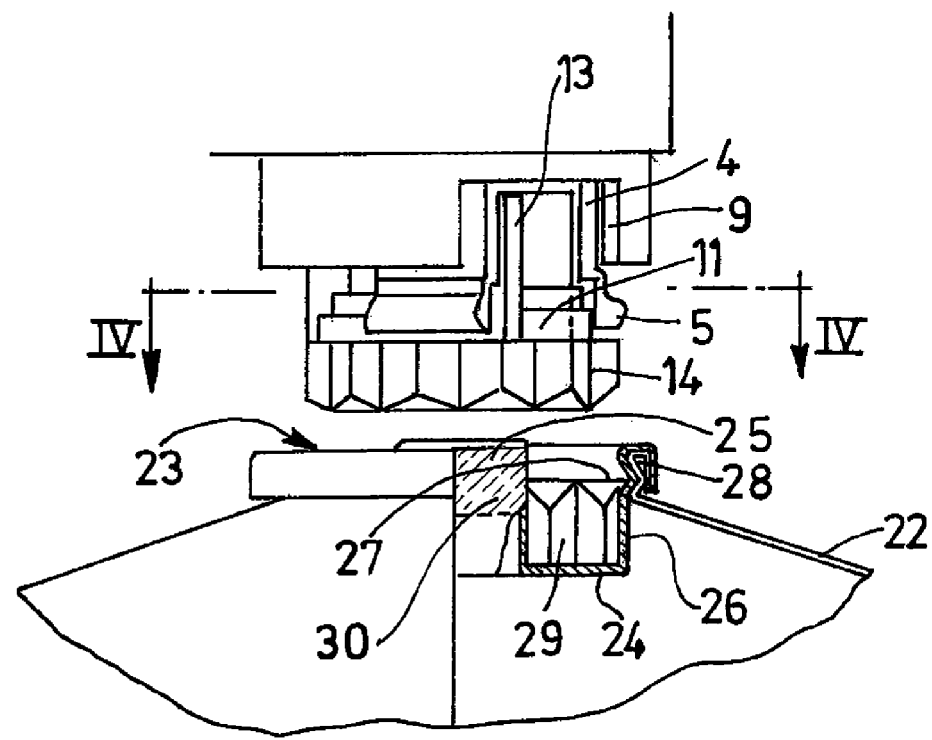
FIG. 3 shows the connecting device facing the cartridge.
Figure 4:
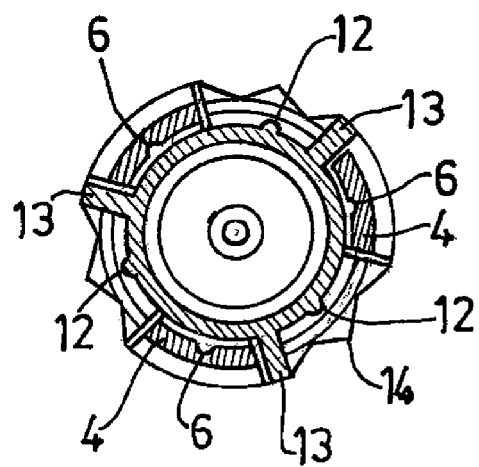
FIG. 4 is a sectional view taken through IV-IV in FIG. 3.

As shown in FIGS. 3 and 5, the rotary ring 10 can turn between a position in which the elastic lugs 4 have a radial release space, this configuration being shown more particularly in FIG. 5, and a position in which, after the rotation of the rotary ring, each of the elastic lugs 4 bears on a heel 11 of the rotary ring 10. The rotation of the rotary ring 10 is limited angularly by each of the stops 13.

The final component of the connecting device is a cylinder 16 of metal or other material, which supports a tube 18 for pushing the shut-off device, the function of this tube being explained below. This metal cylinder 16 is fixed in the body of the tap 2 and retains the rotary ring by means of a shoulder 19.

It should also be noted that a spring 20 is interposed between the coupling ring 3 and the rotary ring 10, the action of this spring 20 tending to place the rotary ring in a position in which the lugs 4 can flex.

Figures 8, 9:
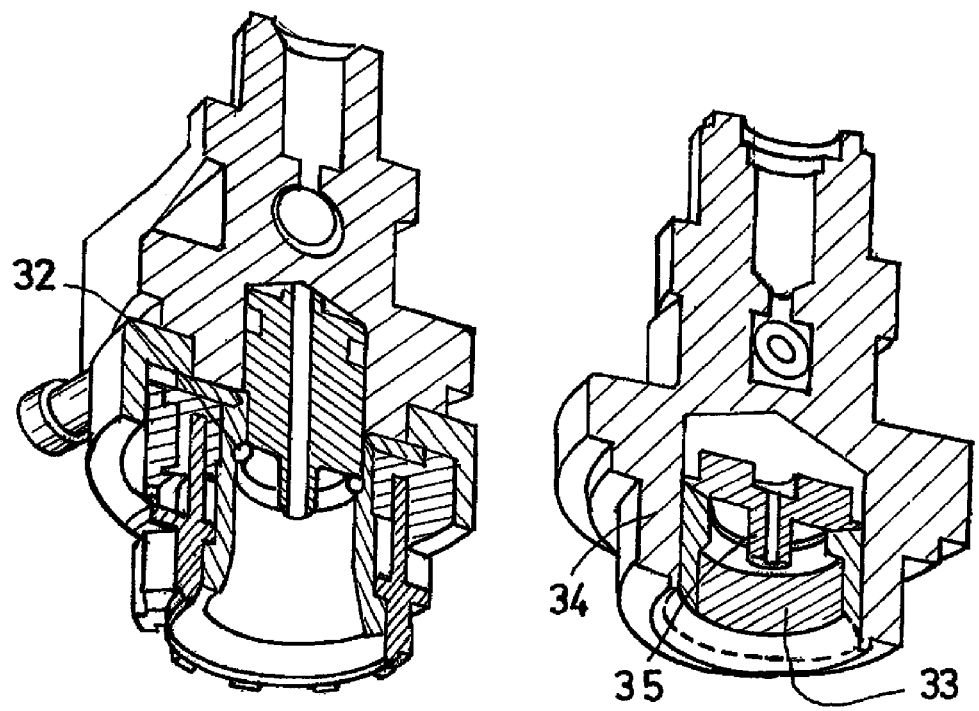
FIG. 8 is a perspective view of the second connecting device with half of it cut away.
FIG. 9 is a perspective view of the third connecting device with half of it cut away
Figure 7:
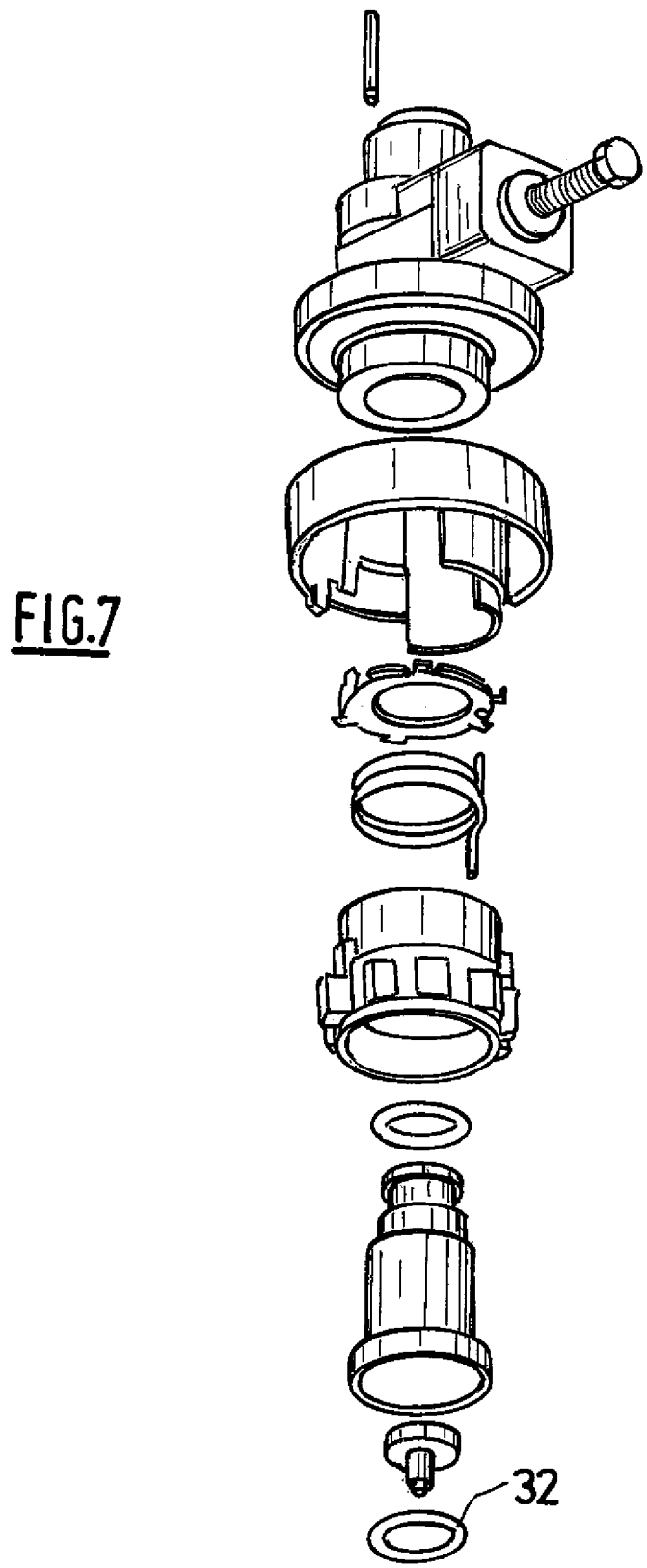
FIG. 7 is an exploded perspective view of a second connecting device.

A second device, shown in FIGS. 7 and 8, re-uses the same elements as the first. It additionally comprises a seal 32 intended to be housed in the cylinder 16, at the bottom of the housing intended to accommodate the shut off device 25.

The cartridge according to the invention, shown in FIGS. 1 and 3, has, in a conventional way, a container 22 whose opening is blocked by a valve 23.

This metal valve 23 has a circular radial bottom wall 24 which supports a central shut-off device 25 and a lateral axial cylindrical wall 26. The valve is joined to the container 22 by means of an annular groove 27 surmounted by an annular bead 28. The shut-off device 25, which is not shown in the drawing, has a conventional structure, in other words comprises a plug pushed by a spring.

The valve 23 has a plurality of teeth 29 in its axial wall.

The first or second device and the corresponding cartridge are used in the following way.

The connecting device, with the gas equipment on top of it, is brought towards the cartridge, as shown in FIG. 3.

Each of the notches 14 of the rotary ring 10 is penetrated by a tooth 29 formed in the axial wall of the valve, while the ribs 5, one of which is provided on each elastic lug 4, engage in the annular groove 27 of the valve 23.

It should be made clear that this engagement of the ribs 5 in the annular groove 27 is possible because the action of the spring 20 with which the device is provided tends to place the rotary ring 10 in a position in which the elastic lugs 4 are radially disengaged.

However, it should be noted that the invention can be applied without the spring 20, in which case the user himself controls the locking and release positions of the rotary ring 10.

As the device is engaged with the cartridge, the tube 18 bears on the shut-off device 25 and allows the gas to pass towards the body of the tap 2 and ultimately towards any gas equipment.

The user then simply has to grasp the cartridge and turn it with respect to the connecting device. This movement is extremely simple and is facilitated by the fact that the cartridge has a large diameter and the user can therefore apply a considerable torque.

At the end of the rotation, each elastic lug 4 bears against a stop 13 of the rotary ring 10, and consequently each elastic lug 4 bears on a heel 11, while the groove 6 formed in the inner surface of each elastic lug 4 snaps on to the longitudinal groove 12 provided in the rotary ring 10. This snap fitting can be accompanied by an audible and tactile signal corresponding to the overcoming of a "sticking point", which indicates to the user that the device has been locked.

The user can also be informed of the completion of locking by the fact that the aperture 9 formed in the skirt of the coupling ring reveals a pictogram printed on the rotary ring, indicating that the locking is complete and that the equipment can be used.

The invention thus provides a connecting device and a liquid combustible gas cartridge whose use is highly intuitive, since the locking tool used is the cartridge itself, which is the object having the largest size and which a user can use naturally and intuitively.

It should also be noted that the device has a reduced number of parts, which makes this solution advantageous in mechanical and economic terms.

Figure 6:
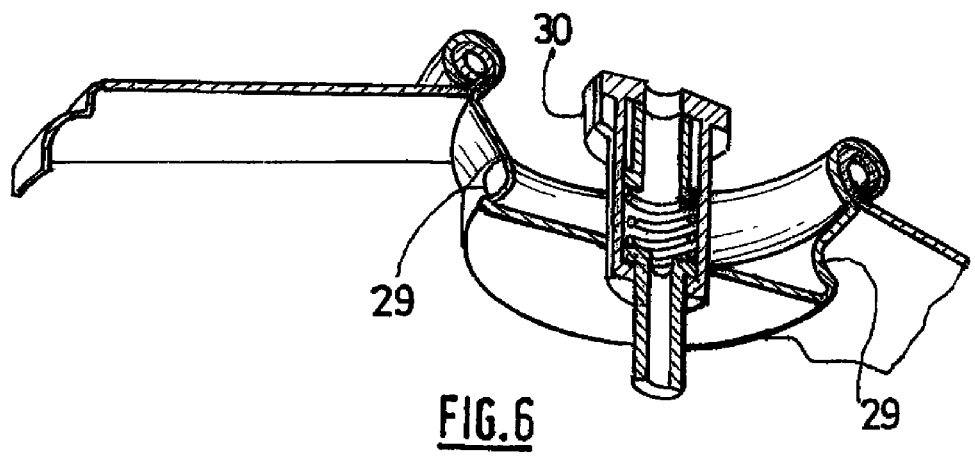
FIG. 6 is a perspective view of a cartridge according to a second embodiment of the invention, with half the cartridge cut away.

According to a second embodiment shown in FIG. 6, the valve comprises just two teeth 29 and the central shut-off device comprises an axial cylindrical exterior wall that has a screw thread 30.

The cartridge according to this second embodiment, by virtue of the screw thread 30, allows for connection with a third connecting device shown in FIG. 9. These are connecting devices of the screw-connection type for gas-operated appliances, in particular in accordance with EN417, class 2, with a standard tapped thread 33 in accordance with 7/16'-28 NS.

In this case, the connecting device comprises a cylinder 34 supporting a tube 35 for pushing the shut-off device, as before. The cylinder comprises an internal tapped thread 33 intended to collaborate with the screw thread 30 of the cartridge in order to secure the connecting device and the cartridge.

Another advantage which should be mentioned is that the cartridge according to the invention is compatible with existing devices having elastic locking lugs.

Clearly, if the cartridge is used with a pre-existing connecting device, the rotation of the cartridge will not lock the device.

Clearly, the invention is not limited to the embodiment described above, but covers all possible embodiments. Numerous variants can be devised in respect of the radial connecting means of the cartridge and the rotary ring.

In particular, it would be possible to devise a simple flat formed on the rotary ring corresponding to a flat formed in the longitudinal wall of the valve.

Other means of indicating the locking of the device can also be provided. In particular, it is possible to extend one or all of the three stops 13 with a finger which could be revealed by an opening formed in the skirt of the coupling ring when the device is in the locking position. An LED illumination system can also be devised to indicate the completion of locking of the device.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "Connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A liquid combustible gas cartridge, comprising a container having an opening blocked by a valve, the said valve having a circular radial bottom wall which supports a central shut-off device and a lateral cylindrical axial wall which has, at its connection to the container, an annular groove surmounted by an annular bead, wherein the axial wall has at least one radial coupling means having at least one radial tooth intended to interact with complementary radial coupling means having at least one radial notch provided in a rotary ring of a connecting device for gas equipment, enabling the device to be moved from a locking position wherein a plurality of ribs provided in a coupling ring of the connecting device are engaged in the annular groove to a release position by the rotation of the cartridge wherein the plurality of ribs are disengaged from the annular groove.

2. The liquid combustible gas cartridge as claimed in claim 1, wherein the at least one radial coupling means of the axial wall of the valve has a plurality of radial teeth.

3. The liquid combustible gas cartridge as claimed in claim 1, wherein the at least one radial coupling means are adjacent to the circular radial bottom wall.

* * * * *